(12) United States Patent
Ueda et al.

(10) Patent No.: US 6,555,024 B2
(45) Date of Patent: Apr. 29, 2003

(54) PRESSURE-SENSITIVE CONDUCTIVE INK COMPOSITION

(75) Inventors: Tsutomu Ueda, Nara (JP); Toshikazu Ooue, Nara (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 09/753,230

(22) Filed: Dec. 28, 2000

(65) Prior Publication Data

US 2001/0015423 A1 Aug. 23, 2001

(30) Foreign Application Priority Data

Dec. 28, 1999 (JP) .......................................... 11-373330

(51) Int. Cl.$^7$ ............................ H01B 1/24; H01B 1/18; B32B 5/16
(52) U.S. Cl. ..................... 252/511; 252/500; 252/511; 252/502; 252/520.22; 524/492; 524/493; 524/495; 524/503; 428/323; 73/763; 73/862.8
(58) Field of Search ................................. 252/511, 500; 524/492, 493, 495, 503; 428/325, 323; 73/763, 862.8

(56) References Cited

U.S. PATENT DOCUMENTS

| 4,595,604 A | 6/1986 | Martin et al. .................. 427/96 |
| 4,765,930 A | 8/1988 | Mashimo et al. ............ 252/511 |
| 5,089,173 A | 2/1992 | Frentzel et al. .............. 252/514 |
| 5,855,820 A | * 1/1999 | Chan et al. .................. 252/511 |
| 5,989,700 A | * 11/1999 | Krivopal ...................... 428/323 |

FOREIGN PATENT DOCUMENTS

| WO | 9945077 | 9/1999 | ........... C09D/11/00 |

OTHER PUBLICATIONS

European Search Report for Application No. EP00311740 dated, Apr. 18, 2002.

* cited by examiner

Primary Examiner—Mark Kopec
Assistant Examiner—Kallambella Vijayakumar
(74) Attorney, Agent, or Firm—Darby & Darby

(57) ABSTRACT

A pressure-sensitive conductive ink composition includes a thermoplastic resin and a conductive filler. The thermoplastic resin is added with a curing agent capable of a partial crosslinkable reaction. The resulting composition maintains its pressure-sensitive characteristics, even at elevated temperatures.

36 Claims, 3 Drawing Sheets

PRESSURE-SENSITIVE CONDUCTIVE INK COMPOSITION

BACKGROUND OF THE INVENTION

The present invention relates to a pressure-sensitive conductive ink composition used for pressure-sensitive sensors and the like which measure, for example, pressure and/or its distribution.

A conventional pressure-sensitive conductive ink composition, mixed with an ink binder in which a thermoplastic resin is dissolved by heating in a high boiling solvent, has been used for pressure-sensitive sensors and the like.

Referring to FIGS. 2 and 3, a pressure-sensitive sensor 1 includes, at one side, a sheet substrate 4 on which line electrodes 2 are printed at predetermined intervals. A pressure-sensitive ink 3 is applied to surround line electrodes 2. At the other side, a sheet substrate 7 has row electrodes 5 printed perpendicular to line electrodes 2. A pressure-sensitive ink 6 is applied to surround row electrodes 5. The surfaces of the respective pressure-sensitive conductive ink layers are opposed to each other.

In the conventional pressure-sensitive conductive ink compositions, however, there is the problem with maintaining the desired pressure sensitive characteristics in a high-temperature atmosphere.

OBJECTS AND SUMMARY OF THE INVENTION

It is an object of the present invention to provide a pressure-sensitive conductive ink composition which overcomes the foregoing problems.

More particularly, it is an object of the present invention to provide a pressure-sensitive conductive ink composition capable of maintaining pressure-sensitive characteristics in a high temperature atmosphere.

Briefly stated, the present invention provides a pressure-sensitive conductive ink composition including a thermoplastic resin and a conductive filler. The thermoplastic resin is added with a curing agent capable of a partial crosslinkable reaction. The resulting composition maintains its pressure-sensitive characteristics, even at elevated temperatures.

To achieve the objects of the present invention, the following technical measures have been undertaken by the inventors.

(1) The pressure-sensitive conductive ink composition of the present invention has a thermoplastic resin and a conductive filler. The thermoplastic resin is added with a curing agent capable of a partial crosslinking reaction.

In the present invention, the thermoplastic resin undergoes a partial crosslinking reaction by the curing agent to be thermoset, thereby improving the glass transition point.

(2) The thermoplastic resin may have polyhydroxy ether. This provides an ether linkage instead of an ester linkage, as ester linkages are inferior in hydrolyzability. This results in an improved humidity resistance.

(3) The pressure-sensitive conductive ink composition of the present invention may also have a non-conductive filler.

(4) The polyhydroxy ether may have a structure of the following general formula (I), preferably synthesized from bisphenol A and epichlorohydrin.

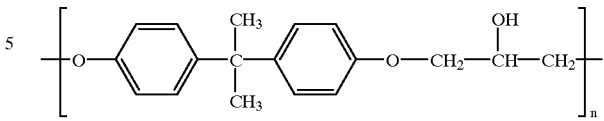

wherein n is from about 1 to about 500, preferably from about 50 to about 250, even more preferably from about 80 to about 150.

This polyhydroxy ether structure gives the composition an advantageous improvement in heat resistance.

(5) The polyhydroxy ether may alternatively have a structure of the following general formula (II), preferably synthesized from tetrabromophenol A and epichlorohydrin.

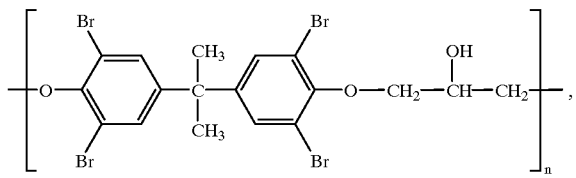

wherein n is from about 1 to about 500, preferably from about 50 to about 250, even more preferably from about 80 to about 150.

This polyhydroxy ether structure advantageously improves the heat resistance while maintaining the flexibility and imparting a flame retardancy.

(6) The curing agent may be one or more isocyanates selected from the group consisting of TDI (tolylene diisocyanate), IPDI (isophorone diisocyanate), HDI (hexamethylene diisocyanate) and XDI (xylylene diisocyanate). These curing agents advantageously improve heat resistance.

(7) The curing agent may be one or more polyisocyanates selected from the group consisting of burette-type, adduct-type and isocyanurate-type isocyanates of TDI (tolylene diisocyanate), IPDI (isophorone diisocyanate), HDI (hexamethylene diisocyanate) and XDI (xylylene diisocyanate). These curing agents improve durability while providing easy handling (in toxicity) at the time of manufacturing.

(8) The curing agent may make use of one or more active hydrogen compounds selected from the group consisting of methyl ethyl ketone, $\epsilon$-caprolactone, ethyl acetoacetate and phenol as a blocking agent. These blocking agents advantageously give a longer shelf life.

(9) The composition may be blended such that the ratio of NCO in the isocyanate curing agent to OH in the polyhydroxy ether (NCO:OH) is preferably about 0.2 to 2.0. This ratio enables the desired rate of the crosslinking reaction.

(10) The conductive filler may be conductive carbon black with a developed structure having an amount of DBP oil absorption of about 200 to 480 ml/100 g. This conductive filler enables the composition to obtain stable conductivity.

(11) The non-conductive filler may be superfine silicon dioxide having a primary particle diameter of about 7 to 40 nm. This enhances the dispersibility of the carbon black as well as the printability of the composition.

(12) The pressure-sensitive sensor of the present invention employs the pressure-sensitive conductive ink composition as described above.

The above, and other objects, features and advantages of the present invention will become apparent from the following description read in conjunction with the accompanying drawings, in which like reference numerals designate the same elements.

DETAILED DESCRIPTION OF THE INVENTION

Figure 1:
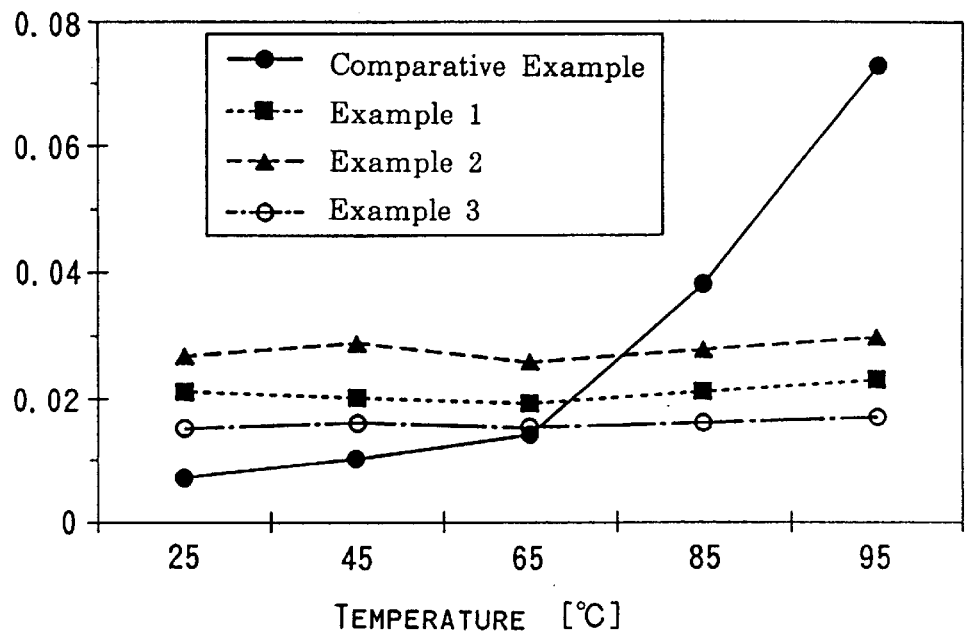
FIG. 1 is a graph showing the temperature stability of the pressure-sensitive characteristics of various samples of the pressure-sensitive sensor of the present invention as compared to a comparative example.
Figure 2:
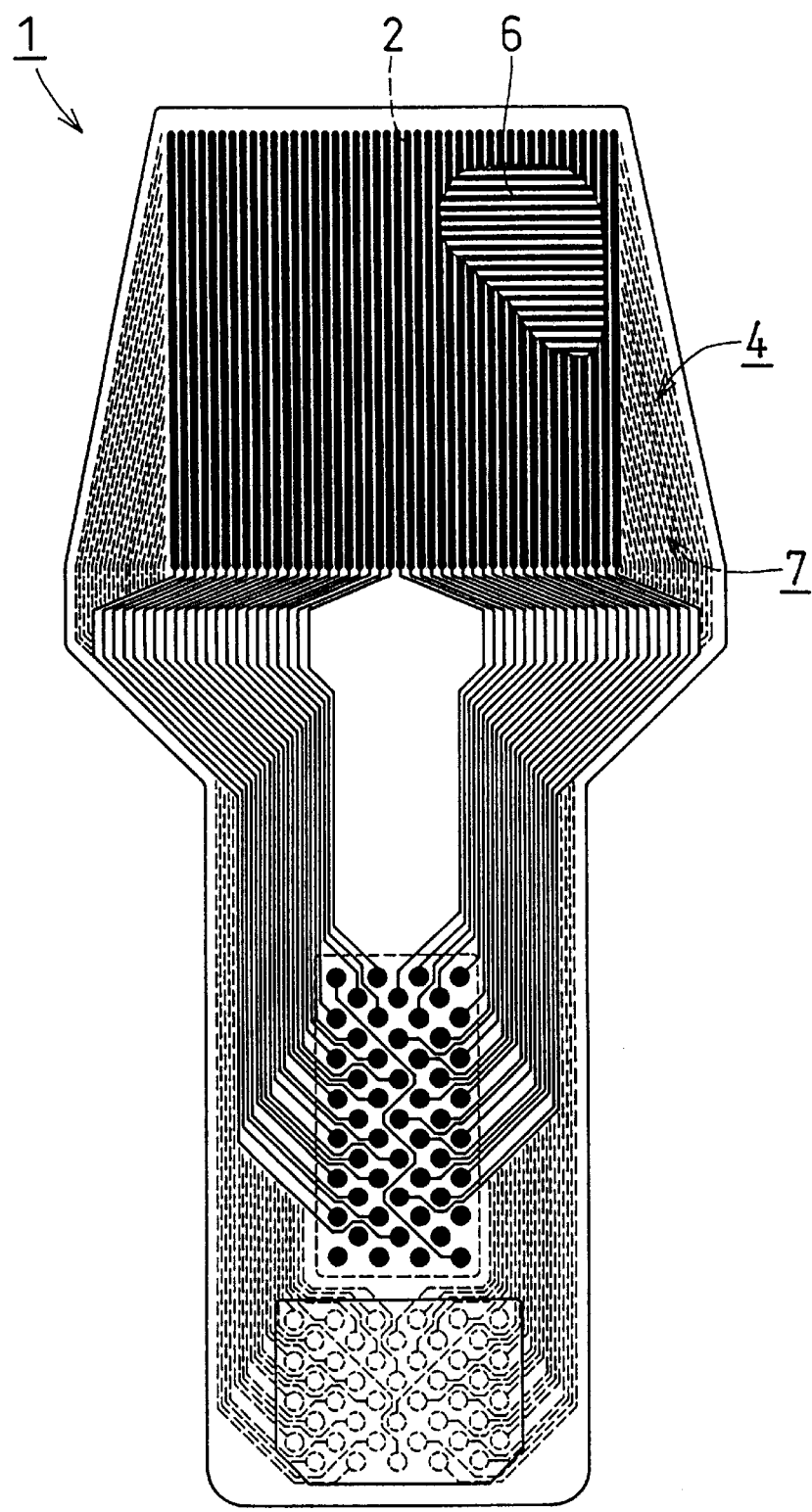
FIG. 2 is a front view of the structure of a pressure-sensitive sensor.
Figure 3:
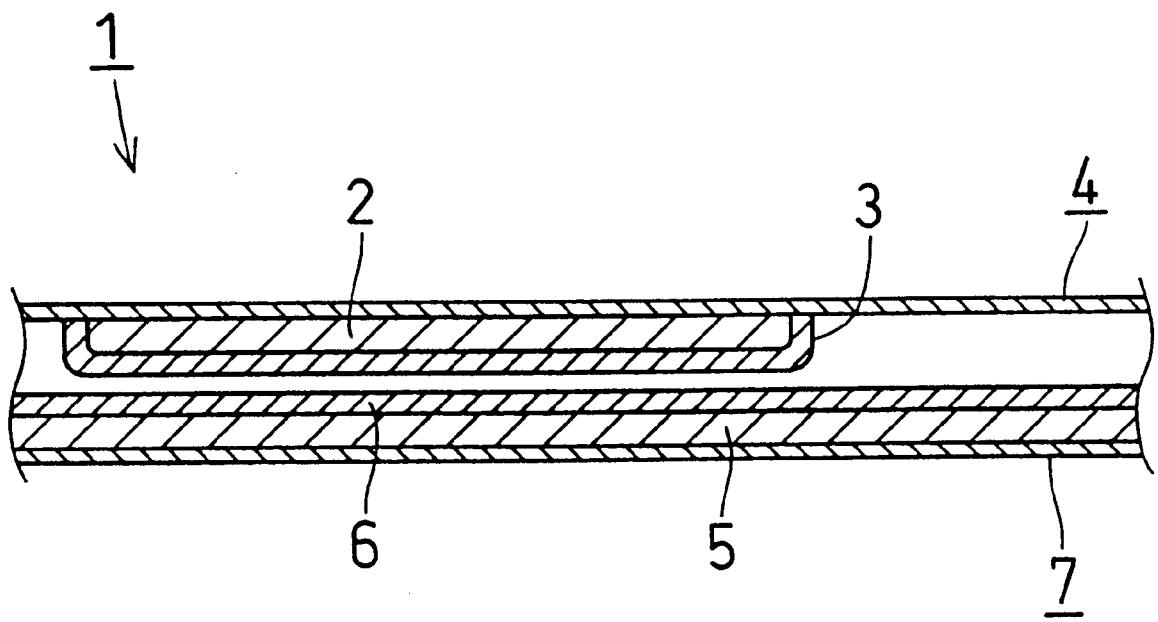
FIG. 3 is an enlarged cross-sectional view of the structure of line electrodes and pressure-sensitive conductive ink applied around the lines electrodes in the pressure-sensitive sensor of FIG. 2.

The pressure-sensitive conductive ink composition of the present invention includes a thermoplastic resin and a conductive filler. The thermoplastic resin further includes a curing agent capable of partial crosslinking reaction.

EXAMPLE 1

Fifty parts by weight of butyl cellosolve acetate solvent was added to 21.1 parts by weight of phenoxy resin (PAPHEN-PKHH from Union Carbide Co., Ltd.) having the structure of the general formula (I)

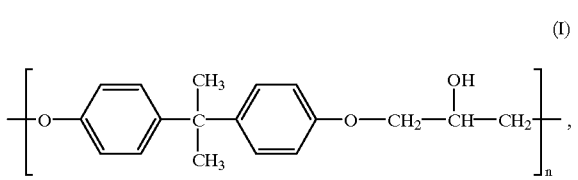

wherein n is as previously defined, 3.5 parts by weight of carbon black (Furnace Black 3950B from Lion Corporation), and 3.5 parts by weight of silicon dioxide particles (Aerosil R812 from Nippon Aerosil Co., Ltd.). These materials were preliminarily mixed and sufficiently kneaded in a roll mill.

The amount of DBP oil absorbed by the carbon black was 310 ml/100 g, and the primary particle diameter of the silicon dioxide particles was 7 nm.

As a curing agent, 21.9 parts by weight of IPDI (LUXATE ALIPHATIC ISOCYANATE IM from Arco Chemical Co., Ltd.) was added to the kneaded material obtained above. The resulting mixture was stirred sufficiently with a stirrer. The resultant kneaded material was applied as print on a polyimide film by a screen printer, preliminarily cured in an oven at 100° C. for 4 minutes, and further cured firmly at 145° C. for 4 minutes to prepare a pressure-sensitive sensor sample.

EXAMPLE 2

Butyl cellosolve acetate solvent (59.4 parts by weight) was added to 16.9 parts by weight of phenoxy resin (Phenototo YP50S from Toto Kasei Co., Ltd.) having hte structure of the general formula (I)

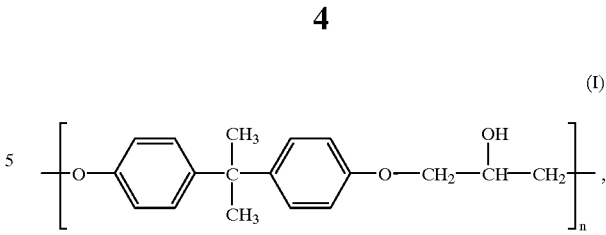

wherein n is as previously defined, 2.8 parts by weight of carbon black (Furnace Black 3950B from Lion Corporation), and 2.8 parts by weight of silicon dioxide particles (Aerosil R812 from Nippon Aerosil Co., Ltd.). These materials were preliminarily mixed and then fully kneaded in a roll mill.

The amount of DBP oil absorbed by the carbon black was 310 ml/100g, and the primary particle diameter of the silicon dioxide particles was 7 nm.

As a curing agent, 18.1 parts by weight of TDI adduct-type polyisocyanate (CORONATE L-70B from Nippon Polyurethane Industry Co., Ltd.) was added to the kneaded material obtained above and sufficiently stirred with a stirrer.

A pressure-sensitive sensor sample was prepared by applying the resultant kneaded material as print in the same manner as in Example 1.

EXAMPLE 3

Butyl cellosolve acetate solvent (49.0 parts by weight) was added to 21.1 parts by weight of phenoxy resin (Phenototo YPB43 from Toto Kasei Co., Ltd.) having the structure of general formula (II)

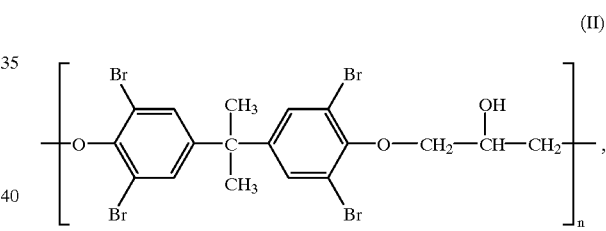

wherein n is as defined above, 2.8 parts by weight of carbon black (Furnace Black 3950B from Lion Corporation) and 4.3 parts by weight of silicon dioxide particles (Aerosil R812 from Nippon Aerosil Co., Ltd.). These materials were preliminarily mixed and then sufficiently kneaded in a roll mill.

The amount of DBP oil absorbed by the carbon black was 310 ml/100 g, and the primary particle diameter of the silicon dioxide particles was 7 nm.

As a curing agent, 22.9 parts by weight of block-type polyisocyanate (Duranate MF-K60X from Asahi Chemical Industry Co., Ltd.) was added to the kneaded material obtained above, and sufficiently stirred with a stirrer.

A pressure-sensitive sensor sample was prepared by applying the resultant kneaded material as print in the same manner as in Example 1.

COMPARATIVE EXAMPLE 1

Carbon black (Furnace Black 3950B from Lion Corporation, 1.4 parts by weight) and 5.6 parts by weight of silicon dioxide particles (Aerosil R812 from Nippon Aerosil Co., Ltd.) were added to 25 parts by weight of polyester resin (Vylon RV200, Toyobo Co., Ltd.). To the resulting mixture was added 68 parts by weight of a mixed solvent of 2-ethoxyethyl acetate and γ-butyrolactone. These materials were preliminarily mixed and then kneaded in a roll mill to prepare a pressure-sensitive sensor sample in the same manner as in the Examples above.

Evaluation Test

The pressure-sensitive sensor samples were respectively pressurized in a pressuring test machine installed in a thermostatic and humidistatic bath while measuring their pressure-sensitive characteristics. The temperatures were set at 25° C., 45° C., 65° C., 85° C., and 95° C., and a pressure of 0.5 kgf/cm² was applied to the samples.

Referring to FIG. 1, the resistance of each sample in Examples 1, 2 and 3 hardly changes at temperatures of 25 to 95° C. The resistance of the Comparative Example, however, dropped rapidly at a temperature of greater than 65° C.

The humidity resistances of respective sensor samples were evaluated by measuring the pressure-sensitive characteristice thereof, at 25° C., after letting them stand for 1,000 hours at 85° C. in 85% relative humidity. The samples of Examples 1, 2 and 3 maintained their pressure sensitivity, whereas the Comparative Example sample showed a drop in resistance under no pressure. Even when pressure is applied back to the Comparative Example sample, there is no longer a change in resistance.

The present invention improves the glass transition point and provides a pressure-sensitive conductive ink composition which is capable of maintaining pressure-sensitive characteristics, even in an atmosphere having a high temperature.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A pressure-sensitive conductive ink composition comprising:

a thermoplastic resin;
   a conductive filler;
   a non-conductive filler;
   a curing agent partially crosslinking said thermoplastic resin;
   said thermoplastic resin being a polyhydroxy ether; and
   said non-conductive filler being ultrafine silicon dioxide having a primary particle diameter of about 7 nm.

2. The pressure-sensitive conductive ink composition according to claim 1, wherein said thermoplastic resin is a polyhydroxy ether having a structure according to the following formula (I):

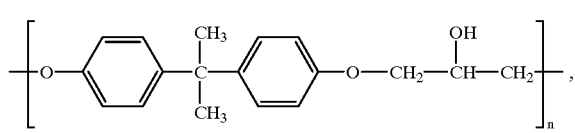

wherein n is from 1 to about 500.

3. The pressure-sensitive conductive ink composition according to claim 1, wherein said thermoplastic resin is a polyhydroxy ether having a structure according to the following formula (II):

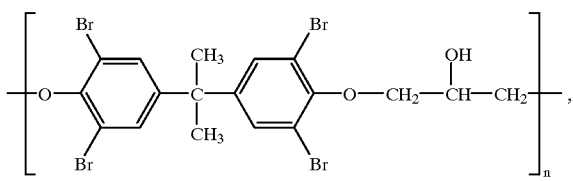

wherein n is from 1 to about 500.

4. The pressure-sensitive conductive ink composition according to claim 1, wherein said curing agent is at least one isocyanate selected from the group consisting of tolylene diisocyanate, isophorone diisocyanate, hexamethylene diisocyanate, and xylylene diisocyanate.

5. The pressure-sensitive conductive ink composition according to claim 1, wherein said curing agent is at least one polyisocyanate selected from the group consisting of a burette type, an adduct type and an isocyanurate type of isocyanates of tolylene diisocyanate, isophorone diisocyanate, hexamethylene diisocyanate, and xylylene diisocyanate.

6. The pressure-sensitive conductive ink composition according to claim 5, wherein:

said curing agent includes a blocking agent; and
   said blocking agent includes at least one active hydrogen compound selected from the group consisting of methyl ethyl ketone, ε-caprolactone, ethyl acetoacetate, and phenol.

7. The pressure-sensitive conductive ink composition according to claim 1, wherein:

said curing agent is an isocyanate curing agent; and
   an NCO:OH ratio of isocyanate in said curing agent to hydroxy in said polyhydroxy ether is in the range from about 0.2 to about 2.0.

8. The pressure-sensitive conductive ink composition according to claim 1, wherein said conductive filler is conductive carbon black having a developed structure with a DBP oil absorption from about 200 to about 480 ml/100 g.

9. The pressure-sensitive conductive ink composition according to claim 2, wherein said curing agent is at least one isocyanate selected from the group consisting of tolylene diisocyanate, isophorone diisocyanate, hexamethylene diisocyanate, and xylylene diisocyanate.

10. The pressure-sensitive conductive ink composition according to claim 3, wherein said curing agent is at least one isocyanate selected from the group consisting of tolylene diisocyanate, isophorone diisocyanate, hexamethylene diisocyanate, and xylylene diisocyanate.

11. The pressure-sensitive conductive ink composition according to claim 2, wherein said curing agent is at least one polyisocyanate selected from the group consisting of a burette type, an adduct type and an isocyanurate type of isocyanates of tolylene diisocyanate, isophorone diisocyanate, hexamethylene diisocyanate, and xylylene diisocyanate.

12. The pressure-sensitive conductive ink composition according to claim 3, wherein said curing agent is at least one polyisocyanate selected from the group consisting of a burette type, an adduct type and an isocyanurate type of isocyanates of tolylene diisocyanate, isophorone diisocyanate, hexamethylene diisocyanate, and xylylene diisocyanate.

13. The pressure-sensitive conductive ink composition according to claim 4, wherein:

said curing agent includes a blocking agent; and said blocking agent includes at least one active hydrogen compound selected from the group consisting of methyl ethyl ketone, ϵ-caprolactone, ethyl acetoacetate, and phenol.

14. The pressure-sensitive conductive ink composition according to claim 9, wherein:

said curing agent includes a blocking agent; and said blocking agent includes at least one active hydrogen compound selected from the group consisting of methyl ethyl ketone, ϵ-caprolactone, ethyl acetoacetate, and phenol.

15. The pressure-sensitive conductive ink composition according to claim 10, wherein:

said curing agent includes a blocking agent; and said blocking agent includes at least one active hydrogen compound selected from the group consisting of methyl ethyl ketone, ϵ-caprolactone, ethyl acetoacetate, and phenol.

16. The pressure-sensitive conductive ink composition according to claim 11, wherein:

said curing agent includes a blocking agent; and said blocking agent includes at least one active hydrogen compound selected from the group consisting of methyl ethyl ketone, ϵ-caprolactone, ethyl acetoacetate, and phenol.

17. The pressure-sensitive conductive ink composition according to claim 12, wherein:

said curing agent includes a blocking agent; and said blocking agent includes at least one active hydrogen compound selected from the group consisting of methyl ethyl ketone, ϵ-caprolactone, ethyl acetoacetate, and phenol.

18. A pressure-sensitive sensor comprising said pressure-sensitive conductive ink composition according to claim 1.

19. A pressure-sensitive sensor comprising said pressure-sensitive conductive ink composition to claim 12.

20. A pressure-sensitive sensor comprising said pressure-sensitive conductive ink composition according to claim 3.

21. A pressure-sensitive sensor comprising said pressure-sensitive conductive ink composition according to claim 4.

22. A pressure-sensitive sensor comprising said pressure-sensitive conductive ink composition according to claim 5.

23. A pressure-sensitive sensor comprising said pressure-sensitive conductive ink composition according to claim 6.

24. A pressure-sensitive sensor comprising said pressure-sensitive conductive ink composition according to claim 7.

25. A pressure-sensitive sensor comprising said pressure-sensitive conductive ink composition according to claim 8.

26. A pressure-sensitive sensor comprising said pressure-sensitive conductive ink composition according to claim 9.

27. A pressure-sensitive sensor comprising said pressure-sensitive conductive ink composition according to claim 10.

28. A pressure-sensitive sensor comprising said pressure-sensitive conductive ink composition according to claim 11.

29. A pressure-sensitive sensor comprising said pressure-sensitive conductive ink composition according to claim 12.

30. A pressure-sensitive sensor comprising said pressure-sensitive conductive ink composition according to claim 13.

31. A pressure-sensitive sensor comprising said pressure-sensitive conductive ink composition according to claim 14.

32. A pressure-sensitive sensor comprising said pressure-sensitive conductive ink composition according to claim 15.

33. A pressure-sensitive sensor comprising said pressure-sensitive conductive ink composition according to claim 16.

34. A pressure-sensitive sensor comprising said pressure-sensitive conductive ink composition according to claim 17.

35. A pressure-sensitive conductive ink composition comprising:

a thermoplastic resin;

a conductive filler; and a curing agent partially crosslinking said thermoplastic resin, wherein the thermoplastic resin is a polyhydroxy ether having a structure according to the following formula (II):

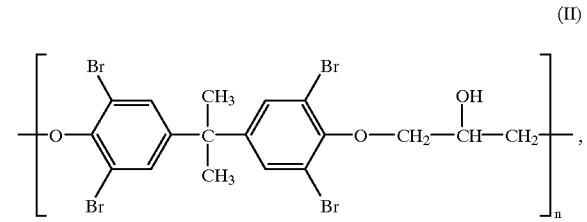

wherein n is from 1 to about 500.

36. A pressure-sensitive sensor comprising said pressure-sensitive conductive ink composition according to claim 35.

UNITED STATES PATENT AND TRADEMARK OFFICE
CERTIFICATE OF CORRECTION

PATENT NO.      : 6,555,024 B2
DATED           : April 29, 2003
INVENTOR(S)     : Tsutomu Euda It is certified that error appears in the above-identified patent and that said Letters Patent is hereby corrected as shown below:

<u>Column 7,</u>
Line 39, delete "claim 12" and substitute with -- claim 2 --
Line 39, delete "composition to" and substitute with -- composition according to --

Signed and Sealed this

Twentieth Day of January, 2004

JON W. DUDAS
*Acting Director of the United States Patent and Trademark Office*